United States Patent [19]

Khutoretsky et al.

[11] Patent Number: 4,820,945
[45] Date of Patent: Apr. 11, 1989

[54] DYNAMOELECTRIC MACHINE ROTOR WITH SUPERCONDUCTING WINDING

[75] Inventors: Garri M. Khutoretsky; Vladimir M. Fridman; Galina A. Zagorodnaya; Leonid V. Maximov; Jury G. Tjurin, all of Leningrad, U.S.S.R.

[73] Assignee: Leningradskoe Proizvodstvennoe Elektromashinostroitelnoe Obiedinenie "Elektrolila", Leningrad, U.S.S.R.

[21] Appl. No.: 117,673

[22] Filed: Nov. 5, 1987

[51] Int. Cl.$^4$ .............................................. H02K 9/00
[52] U.S. Cl. ..................................... 310/52; 310/261; 384/912
[58] Field of Search ................ 310/10, 40 R, 52, 261, 310/5.1; 384/300, 907, 907.1, 912; 184/99

[56] References Cited

U.S. PATENT DOCUMENTS

| | | | |
|---|---|---|---|
| 4,123,676 | 10/1978 | Cooper | 310/52 |
| 4,152,609 | 5/1979 | Cooper | 310/52 |
| 4,532,445 | 7/1985 | Iwamoto | 310/52 |

FOREIGN PATENT DOCUMENTS 1351601  5/1974  United Kingdom .

OTHER PUBLICATIONS

Electric Review Int'l. v. 204, No. 14, 1979, Apr. England Commercial Superconducting Generator, pp. 80-83.

*Primary Examiner*—R. Skudy
*Attorney, Agent, or Firm*—Lilling & Greenspan

[57] ABSTRACT

Disclosed is a dynamoelectric machine rotor with a superconducting winding, including an inner shaft formed by a superconducting winding supporting structure, an outer shaft formed by a cylindric shell and end extensions fixed to the ends thereof, an electromagnetic shield including an inner cylinder made of a material with high electrical conductivity and an outer cylinder made of a material with high mechanical strength, the electromagnetic shield being fitted on the outer shaft with a radial interference, and a layer of a solid lubricant interposed between the adjoining surfaces of the electromagnetic shield and outer shaft.

1 Claim, 1 Drawing Sheet

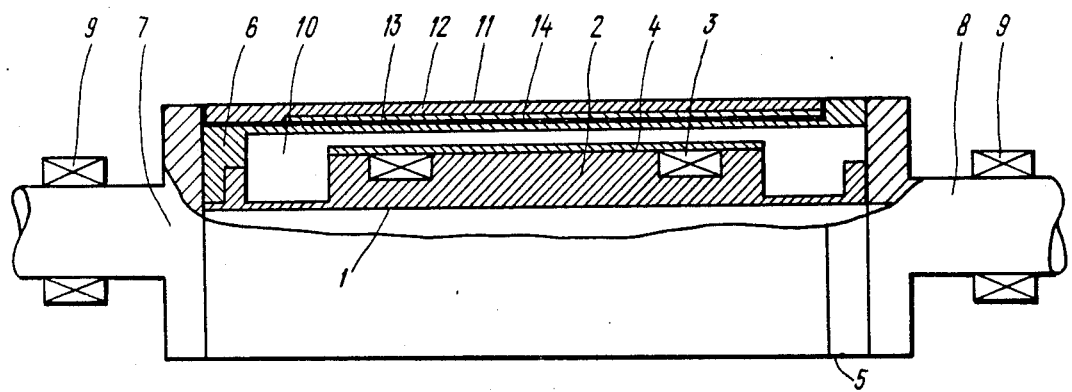

DYNAMOELECTRIC MACHINE ROTOR WITH SUPERCONDUCTING WINDING

BACKGROUND OF THE INVENTION

1. Field of the Invention

The present invention relates to dynamoelectric machines, and more particularly to dynamoelectric machine rotors with superconducting windings. It can be used most advantageously in high-rated cryogenic turbine generators.

2. Description of the Prior Art

To protect a rotor superconducting winding from high electromagnetic fields caused by stator currents under abnormal conditions, the rotor winding is enclosed by an electromagnetic shield. The electromagnetic field produced by currents induced in the shield cancels out said external fields of the stator winding, thus preventing them from penetrating into the rotor winding. Interaction between the shield and stator fields is accompanied by the development of high dynamic forces acting on the shield, such as a dynamic torsional moment.

Known in the prior art is a dynamoelectric machine rotor with a superconducting winding (GB, A, 1351601) wherein the electromagnetic shield is provided with an outer casing made of titanium rings shrink fitted thereon to increase its strength. The shield is bolted to rotor and extensions supported in bearings, the shield and end extension being kept from rotation relative to a superconducting winding supporting structure by means of cotter pins.

The disadvantage of such a rotor lies in that a dynamic torsional moment arising under abnormal conditions, such as on shorting of the stator winding or nonsynchronous switching of the dynamoelectric machine into a network is completely transmitted to the shafting of the dynamoelectric machine due to a rigid connection between the electromagnetic shield and the supporting structure in a tangential direction. Torsional vibrations arising in the shafting produce therein substantial mechanical stresses which may result in its failure. Moreover, under abnormal conditions the electromagnetic shield is also subjected to radial forces bending and compressing the shield. These forces produce in the shield appreciable mechanical stresses, the outer casing having only a negligible effect on their values. At the same time, materials used for the electromagnetic shield, such as copper, have a high electrical conductivity required to provide efficient shielding, but as a rule do not possess sufficient mechanical strength to take up electrodynamic forces bending the shield of a high-rated turbine generator.

Also known in the prior art is a dynamoelectric machine rotor with a superconducting winding (Electrical Review International, v. 204, No. 14, 1979, April, England, "Commerical superconducting generator", p. 80-83), comprising an inner shaft formed by a superconducting winding supporting structure, an outer shaft formed by a cylindric shell encapsulating the rotor and rigidly fixed to end extensions at the ends thereof, and an electromagnetic shield including an inner cylinder made of material with a high electrical conductivity and an outer cylinder made of material with a high mechanical strength. The electromagnetic shield is fitted on the outer shaft with a radial interference.

In this rotor a maximum magnitude of a torsional moment transmitted from the shield to the shafting is defined by frictional forces between the shield and the shell and, hence, is dependent on the interference of their connection. However, compressive forces acting on the shield of a high-rated cryogenic turbine generator under abnormal conditions are rather high and may result in a substantial increase in frictional forces between the shield and the shell. Hence, a maximum moment transmitted to the shafting is also increased. Besides, when the shield is subjected to a high torsional moments, it may slip relative to the outer shaft. This slippage may be accompanied by injuries to the mating surfaces of the shield and outer shaft, appearing as scores, microwelds, ect., particularly when the outer shield is made of titanium, frictional forces increasing along with the increase of these injuries. Hence, a maximum magnitude of a tortional moment transmitted to the outer shaft is not only high, but will increase in the course of operation of a dynamoelectric machine. Thus, for a given rotor, with a high power of a dynamoelectric machine, there is also a danger of shafting failure under abnormal conditions.

SUMMARY OF THE INVENTION

It is an object of the present invention to improve mechanical strength of a dynamoelectric machine rotor with a superconducting winding under abnormal operating conditions. It is another object of the present invention to provide a dynamoelectric machine rotor with a superconducting winding, wherein a maximum magnitude of a torsional moment transmitted from the electromagnetic shield of the rotor to the shafting under abnormal operating conditions is reduced and stabilized.

It is still another object of the present invention to provide a dynamoelectric machine rotor with a superconducting winding, wherein injuries to the mating surfaces of the electromagnetic shield and the outer shaft are eliminated.

With these and other objects in view there is proposed a dynamoelectric machine rotor comprising an inner shaft formed by a superconducting winding supporting structure, and an outer shaft formed by a cylindric shell hermetically encapsulating the rotor and end extensions rigidly fixed to the ends of the shell and supported in bearings. The electromagnetic shield fitted on the outer shaft with a radial interference includes an inner cylinder made of a material with a high electrical conductivity and an outer cylinder made of a material with a high mechanical strength. Interposed between the adjoining surfaces of the electromagnetic shield and outer shaft is a layer of a solid lubricant.

The layer of a solid lubricant between the adjoining surfaces of the electromagnetic shield and outer shaft reduces frictional forces arising therebetween and, hence, a maximum torsional moment transmitted from the shield to the shaft since this maximum moment cannot be greater than a moment of frictional forces between said elements. Besides, if a relative slippage of the electromagnetic shield and outer shaft occurs, the lubricant layer prevents their mating surfaces from a variety of injuries, whereby frictional forces therebetween remain invariable in the course of dynamoelectric machine operation and a maximum torsional moment taken up by the shaft is stabilized. All these features provide an improved mechanical strength of the rotor.

The aforementioned and other objects and advantages of the present invention will be more apparent from the following detailed description of the preferred embodiment thereof taken with reference to the accompanying drawing.

BRIEF DESCRIPTION OF THE DRAWINGS

The drawing shows a diagrammatic view of a dynamoelectric machine rotor with a superconducting winding, made according to the invention.

DETAILED DESCRIPTION OF THE PREFERRED EMBODIMENT

A dynamoelectric machine rotor with a superconducting winding according to the invention comprises an inner shaft 1 formed by a supporting structure 2 carrying a superconducting winding 3 enclosed by a shrouding cylinder 4, and an outer shaft 5 formed by a shell 6 and two end extensions 7 and 8 fixed to the ends of the shell 6 by means of sealed flange joints and supported in bearings 9 a vacuum chamber 10 being formed inside the outer shaft to protect the superconducting winding 3 against external heat inflows.

The outer shaft 5 is connected to the inner shaft 1 such as by means of axially resilient members which are not shown in the drawing since they do not form a part of the present invention.

The rotor also comprises an electromagnetic shield 11 including an outer cylinder 12 and an inner cylinder 13. The electromagnetic shield 11 is fitted on the outer shaft 5 with a radial interference. The inner cylinder 13 of the electromagnetic shield 11 is made of material with a high electrical conductivity, such as copper, and forms, properly an actual shield protecting the superconducting winding 3 against electromagnetic fields produced by currents of the stator winding (not shown) under abnormal operating conditions. The outer cylinder 12 as well as the shell 6 are made of a material with a high mechanical strength, such as titanium alloys, and serve to increase the strength of the electromagnetic shield.

In the illustrated embodiment of the present invention the electromagnetic shield 11 is fitted on the shell 6 and fixed in the axial direction between the annular projection thereof and the flange of the end extension 7. However, the electromagnetic shield 11 may be fitted on the shell 6 and flange of the end extension 7, but in this case the flange of the end extension 7 is made with a diameter equal to the outer diameter of the shell 6.

According to the invention, applied between the adjoining surfaces of the electromagnetic shield 11 and outer shaft 5, both the inner and end ones, is a layer 14 of a solid lubricant, such as molybdenum disulfide. To provide a minimum friction coefficient, the layer 14 is applied by rubbing in a dry powder. The powder may be rubbed in either over respective areas of the cylinders 12 and 13 of the electromagnetic shield 11 or over the surface areas of the shell 6 and end extension 7, the latter being more convenient since the shell 6 engages the shield 11 with its outer cylindric surface. Instead of molybdenum disulfide, other types of a solid lubricant, such as graphite may be used. The type of a solid lubricant forming the layer 14 is chosen depending on the characteristics of the material of the shell 6, and extensions 7 and cylinders 12 and 13 of the electromagnetic shield 11 and based on the maximum allowable torsional moment transmitted from the shield 11 to the outer shaft 5. The same considerations are taken into account when choosing an interference fit between the shield 11 and the outer shaft 5.

When a dynamoelectric machine operates under rated conditions, forces acting on the shield 11, primarily centrifugal forces, are of a static nature. Small dynamic forces arising on starting, as well as under conditions of small synchronous swinging, etc. do not cause displacement of the shield 11 relative to the outer shaft 5 with a properly chosen radial interference therebetween. Under abnormal operating conditions, e.g. on sudden shorting of the stator winding, the shield 11 is subjected to substantial dynamic forces. As this takes place, radial forces uniformly distributed around the circumference press the shield 11 against the shell 6 thus increasing a contact pressure therebetween. Nonuniformly distributed radial forces cause bending of the shield 11 in a plane normal to the rotor axis and are taken up primarily by the shell 6 and outer cylinder 12 having a high strength. Tangential forces acting on the shield 11 develop a dynamic torsional moment. As long as its magnitude does not exceed a maximum moment of frictional forces between the shield 11 and outer shaft 5, the shield 11 remains stationary relative to the outer shaft 5 and the entire torsional moment is transmitted to the outer shaft 5. With the increase of the torsional moment acting on the shield 11 above the magnitude of the maximum moment of frictional forces between the shield 11 and the shaft 5, the torsional moment transmitted to the shaft 5 does not rise and remains equal to said magnitude of the maximum moment of frictional forces, the shield 11 rotating relative to the outer shaft 5. Electrodynamic forces acting on the shield 11, including a torsional moment, are of an oscillatory nature, and with its sense reversed the torsional moment may cause a reverse rotation of the shield 11. The angle of slippage of the shield 11 relative to the outer shaft 5 is defined by the magnitude of forces acting on the shield 11 as well as by inertial properties thereof. With a large mass of the shield 11 this angle is small, which determines the stability of vibrational characteristics of the dynamoelectric machine.

The layer 14 of a solid lubricant applied between the adjoining surfaces of the shield 11 and outer shaft 5 provides a reduction of a frictional force therebetween and, hence, of a maximum magnitude of the torsional moment transmitted from the shield 11 to the shaft 5. Besides, the slipping of the shield 11 relative to the outer shaft 5, the layer 14 protects their mating surfaces against injuries, such as microwelding, which in turn provides a constant magnitude of the maximum torsional moment transmitted to the rotor shaft in the course of dynamoelectric machine running. The layer 14 of a solid lubricant is retained on the surface of the outer shaft 5 (or shield 11) throughout the entire period of machine operation without evaporating and decomposing with an increase of the temperature of the outer portion of the rotor in the course of operation.

It is to be understood that the preferred embodiment of the present invention described hereinabove is given merely as an illustration and that various modifications thereof are possible without departing from the spirit and scope of the invention as set forth in the appended claim.

What is claimed is:

1. A dynamoelectric machine rotor with a superconducting winding, comprising:
   an inner shaft including a superconducting winding supporting structure;
   an outer shaft including a cylindric shell for hermetic encapsulating the rotor and two end extensions rigidly fixed to said shell at both ends thereof for supporting the rotor in bearings;

an electromagnetic shield including an inner cylinder made of a material with high electrical conductivity and an outer cylinder made of a material with high mechanical strength, said electromagnetic shield being fitted on said outer shaft with a radial interference such that said electromagnetic shield and said outer shaft have surface areas adjoining each other; and a layer of a solid lubricant interposed between said surface areas of said electromagnetic shield and said surface areas of said outer shaft, whereby a maximum magnitude of a torsional moment transmitted from said electromagnetic shield to said outer shaft under abnormal conditions of operation of a dynamoelectric machine is reduced and stabilized.

* * * * *